(12) United States Patent
Heck et al.

(10) Patent No.: US 11,906,777 B2
(45) Date of Patent: Feb. 20, 2024

(54) INTEGRATED PHOTONIC TRANSCEIVER

(71) Applicant: Intel Corporation, Santa Clara, CA (US)

(72) Inventors: John Heck, Berkeley, CA (US); Lina He, San Jose, CA (US); Sungbong Park, Sunnyvale, CA (US); Olufemi Isiade Dosunmu, San Jose, CA (US); Harel Frish, Albuquerque, NM (US); Kelly Christopher Magruder, Albuquerque, NM (US); Seth M. Slavin, Albuquerque, NM (US); Wei Qian, Walnut, CA (US); Ansheng Liu, Cupertino, CA (US); Nutan Gautam, Sunnyvale, CA (US); Mark Isenberger, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 16/797,657

(22) Filed: Feb. 21, 2020

(65) Prior Publication Data
US 2020/0192026 A1    Jun. 18, 2020

(51) Int. Cl.
*G02B 6/12* (2006.01)
*H04J 14/02* (2006.01)
*G02B 6/122* (2006.01)

(52) U.S. Cl.
CPC ..... *G02B 6/12007* (2013.01); *G02B 6/12004* (2013.01); *G02B 6/1228* (2013.01); *H04J 14/02* (2013.01); *G02B 2006/12061* (2013.01)

(58) Field of Classification Search
None
See application file for complete search history.

(56) References Cited

U.S. PATENT DOCUMENTS

2016/0202421 A1* 7/2016 Chen ................. G02B 6/14
                                                     385/49

FOREIGN PATENT DOCUMENTS

CN          113296190 A      8/2021

* cited by examiner

*Primary Examiner* — Chad H Smith
(74) *Attorney, Agent, or Firm* — Akona IP PC

(57) ABSTRACT

Embodiments may relate to a wavelength-division multiplexing (WDM) transceiver that has a silicon waveguide layer coupled with a silicon nitride waveguide layer. In some embodiments, the silicon waveguide layer may include a tapered portion that is coupled with the silicon nitride waveguide layer. In some embodiments, the silicon waveguide layer may be coupled with a first oxide layer with a first z-height, and the silicon nitride waveguide layer may be coupled with a second oxide layer with a second z-height that is greater than the first z-height. Other embodiments may be described or claimed.

20 Claims, 9 Drawing Sheets

INTEGRATED PHOTONIC TRANSCEIVER

BACKGROUND

Silicon photonic transceivers may integrate various functionalities such as lasers, modulators, photodetectors, passives, electronics, etc. into a single component. However, it may be difficult to integrate such silicon photonic transceivers with an element such as a silicon nitride passive optical component because of the high thermal budget and low optical confinement of such components.

DETAILED DESCRIPTION

Figure 1:
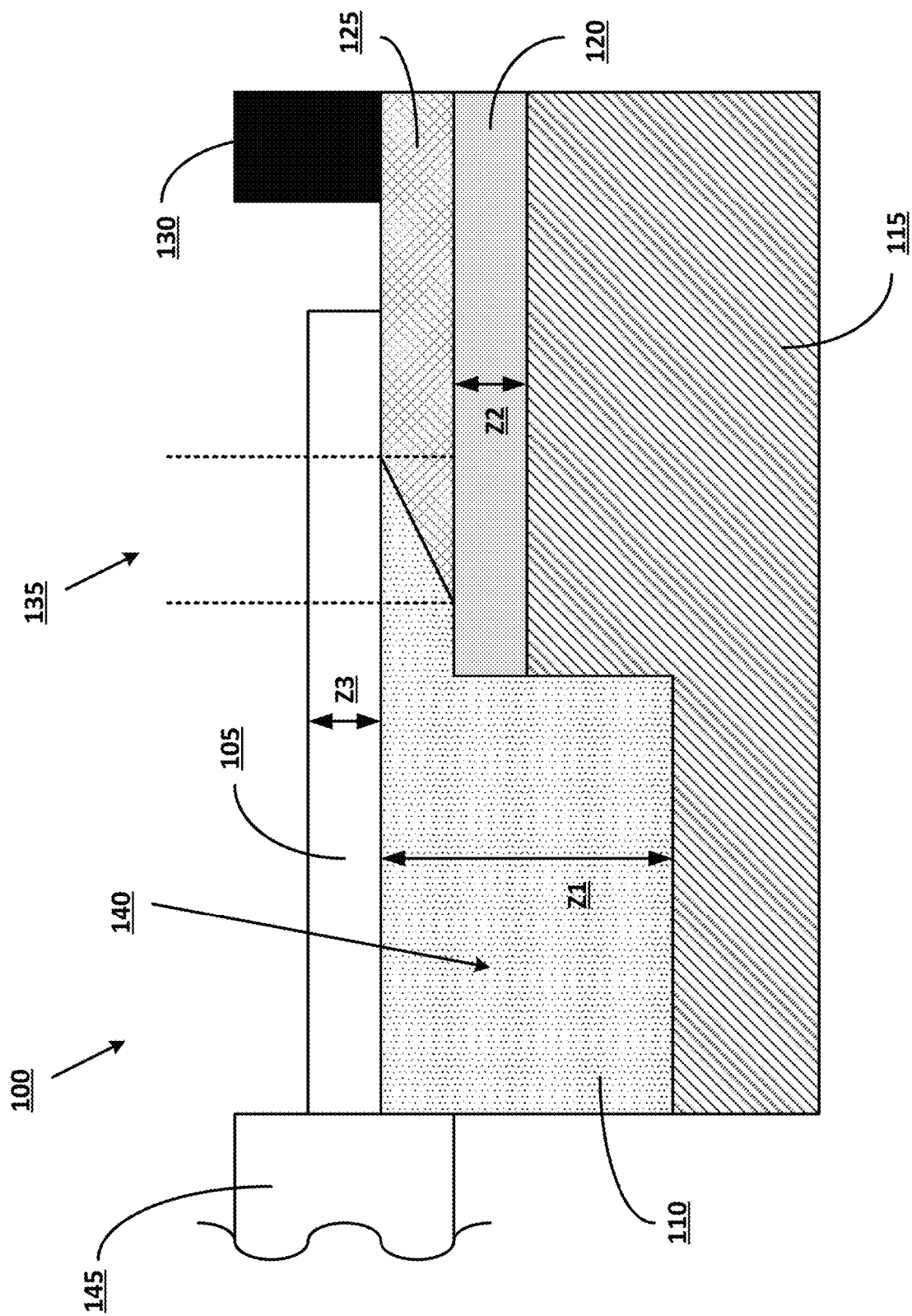
FIG. 1 depicts an example side-view of a photonic transceiver, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature on a second feature," may mean that the first feature is formed/deposited/disposed/etc. over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise. Additionally, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined, e.g., using scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

As noted, silicon photonics transceivers may integrate multiple functionalities or components into a single silicon-based structure. Such functionalities or components may include lasers, modulators, photodetectors, passive components, basic electrical components or functionalities, etc. In some embodiments, it may be desirable to integrate one or more silicon nitride (SiN) passive optical components such as multiplexers or demultiplexers into the silicon-based transceiver because the SiN components may be relatively stable over a variety of temperature ranges. However, such integration may be difficult to do in legacy transceivers because the SiN elements may have a high thermal budget and a low optical confinement, and so may require thick oxide cladding on all side of the SiN elements to operate properly.

Embodiments herein may relate to resolving one or more of these issues with respect to the integration of SiN elements into the transceiver to form a wavelength-division multiplexed (WDM) transceiver that integrates both silicon and SiN elements. For example, embodiments relate to a structure or process to integrate a SiN component such as a multiplexer or demultiplexer into a fully-integrated silicon-based optical transceiver. In some embodiments, the SiN element may be deposited relatively early in the manufacturing process to enable a high-quality thermal SiN film to be used. In some embodiments, the process may enable direct coupling between the SiN film and a silicon-on-insulator (SOI) silicon layer (e.g., a silicon waveguide). In some embodiments, the process may include placing a thick oxide-based cladding between the SiN element and a silicon substrate that is formed by filling a cavity in the silicon substrate. The cladding layer may help mitigate, reduce, or prevent leakage of the optical signal into or through the silicon substrate.

Embodiments may provide a number of advantages. For example, the proportion of WDM transceivers to parallel (e.g., single-wavelength) transceivers may increase as bandwidth requirements increase across the optical industry. Having a fully-integrated, temperature-stable WDM transceiver may become increasingly important. Embodiments herein may enable the integration of a temperature-stable SiN component in a WDM transceiver.

Embodiments herein may have one or more notable characteristics. For example, in order to achieve high-quality SiN components, a process such as low-pressure chemical vapor deposition (LPCVD) may be used. The LPCVD process may take place at a relatively high temperature, for example on the order of approximately 750 degrees Celsius (° C.). The LPCVD process may result in a SiN film with characteristics such as low physical stress, precise refractive index, or low optical loss.

Another such characteristic may be based on a SiN layer (e.g., the SiN layer deposited using the LPCVD process described above) that has a thickness on the order of approximately 350 nanometers (nm). In such a SiN layer, the optical mode of an optical signal propagating through the SiN layer may expand several micrometers ("microns") beyond the SiN core. As such, it may be desirable for embodiments to include a relatively thick oxide-based dielectric to prevent the optical mode from leaking from the SiN waveguide into the silicon substrate. Such a dielectric may be, for example, silicon oxide (SiO$_2$) or some other oxide or optical dielectric.

Another such characteristic may be that the coupling between a silicon waveguide and a SiN waveguide may require an adiabatic coupler. In the coupling, the silicon waveguide may be tapered to allow the light to pass into the SiN waveguide (which may have a lower refractive index). The tapering may be vertical or horizontal.

At a basic level, the transceiver may include a cavity that is etched out of the silicon substrate, and the cavity may be later backfilled with an oxide-based dielectric such as SiO$_2$. The dielectric may be polished, and then the SiN waveguide 105 may be patterned or otherwise deposited on the dielectric, for example through LPCVD as described above. The SiN waveguide may be, or may be part of, a passive optical element such as a multiplexer, demultiplexer, delay line etc. The demultiplexer may be an arrayed waveguide (AWG), an Echelle grating, or some other type of demultiplexer.

The optical signal may be coupled between the SiN waveguide and the dielectric through the use of a tapered silicon waveguide, which may act as a waveguide. The silicon waveguide may be beneath, on top of, adjacent to, or otherwise located with respect to the SiN waveguide. In order to couple light between a chip such as a laser or some other chip of the transceiver and the optical fiber that is coupled to the transceiver, the SiN waveguide may be used directly as a coupler. However, in other embodiments additional or alternative coupling mechanisms may be used to couple the optical signal to the optical fiber.

Figure 2:
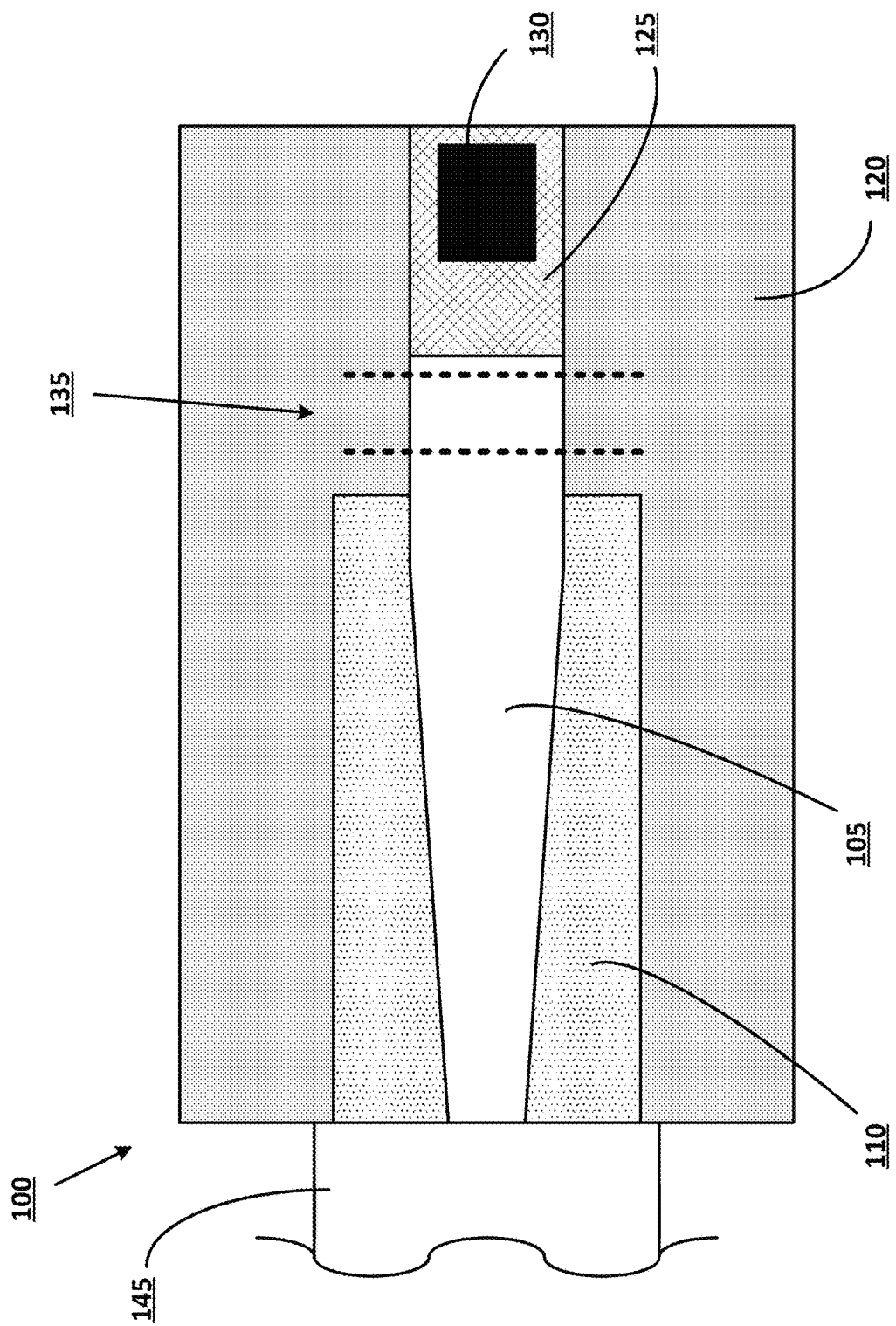
FIG. 2 depicts an example top-down view of the photonic transceiver of FIG. 1, in accordance with various embodiments.

FIGS. 1 and 2 depict an example transceiver that includes a SiN waveguide, in accordance with various embodiments. Specifically, FIG. 1 depicts an example side-view of a photonic transceiver, in accordance with various embodiments. FIG. 2 depicts an example top-down view of the photonic transceiver of FIG. 1, in accordance with various embodiments. It will be understood that the embodiment of FIGS. 1 and 2 is intended as a highly simplified embodiment, and various additional characteristics such as patterning layers, passive elements such as resistors/capacitors/inductors/etc., conductive pathways such as traces, vias, etc. may be omitted from the depiction of FIGS. 1 and 2.

Specifically, FIGS. 1 and 2 depict an example transceiver 100. The transceiver 100 may include a substrate layer 115. The substrate layer 115 may be, for example, silicon or some other appropriate substrate layer. Although not depicted, the substrate layer 115 may be cored or coreless, and may include one or more layers of material with various conductive, passive, or active elements within or on the substrate layer 115.

The substrate layer 115 may include a cavity 140 in at least a portion of substrate layer 115. The cavity 140 may be formed through an etching technique such as optical etching, chemical etching, mechanical etching or drilling, etc. The cavity 140 may then be backfilled with a dielectric material 110. The dielectric material 110 may be, for example, an oxide-based dielectric material such as SiO$_2$. However, other embodiments may include an additional or alternative dielectric material 110 which may be oxide-based, a dielectric material that is not oxide-based, a dielectric material with a dopant, etc.

A SiN waveguide 105 may be positioned on the dielectric layer 110 as shown. For example, in some embodiments the SiN waveguide 105 may be formed through a technique such as LPCVD, however in other embodiments the SiN waveguide 105 may be formed through lamination, some other form of deposition, etc. In some embodiments, the SiN waveguide 105 may have a z-height Z3 on the order of approximately 250 nanometers (nm), while in other embodiments the SiN waveguide 105 may be thicker or thinner. Generally, Z3 may be between approximately 50 nm and approximately 3000 nm.

The SiN waveguide may be formed of a pure or doped SiN material such as Si$_3$N$_4$ or some other SiN or SiN-based material. As may be seen, the SiN waveguide 105 may be coupled with an optical fiber 145 which may be, for example, a single-mode fiber (SMF) or some other type of optical fiber. As may be seen, the dielectric layer 110 may have a z-height Z1 that is measured within the cavity 140 between the substrate layer 115 and the SiN waveguide 105. Z1 may be between, for example, approximately 1 micron and approximately 3 microns. As noted above, in some embodiments the optical mode of the optical signal within the SiN waveguide 105 may expand several microns beyond the core of the SiN waveguide 105. Therefore, it may be desirable for the dielectric layer 110 to be relatively thick so that the optical signal does not leech from the SiN waveguide 105 through the dielectric layer 110 into the substrate layer 115, resulting in an undesirable loss of signal strength of the signal moving from the SiN waveguide 105.

It will be understood, however, that in other embodiments the SiN waveguide 105 may be coupled with another optical element such as an additional silicon waveguide, etc. instead of the optical fiber 145. In general, the SiN waveguide 105 may be considered an optical coupling that is to optically couple the silicon waveguide 125 with another element such as a silicon waveguide, the optical fiber 145, a laser, an optical transmitter, an optical receiver, etc.

The transceiver 100 may further include a second dielectric layer, which may be referred to as a buried oxide (BOX) layer 120. The BOX layer 120 may be formed of, for example, an oxide-based dielectric material such as $SiO_2$. However, in other embodiments the BOX layer 120 may be formed of a different optically dielectric material. In some embodiments, the BOX layer 120 and the dielectric layer 110 may be formed of the same material, whereas in other embodiments the BOX layer 120 and the dielectric layer 110 may be formed of different materials. The BOX layer 120 may have a z-height Z2. Z2 may be on the order of approximately 1 micron in some embodiments, while in other embodiments Z2 may be larger or smaller. The z-height of the BOX layer 120 may be dependent on one or more factors such as thermal or optical isolation from the substrate layer 115. It will be understood however, as described further with respect to FIG. 9, that in some embodiments the dielectric layer 110 may not be present if the BOX layer 120 has a sufficient thickness to prevent leeching of the optical signal from the SiN waveguide 105 into the substrate layer 115.

The transceiver 100 may further include a silicon waveguide 125 deposited on at least a portion of the BOX layer 120 as depicted in, for example, FIG. 1. The silicon waveguide 125 may be formed of a doped or un-doped silicon-based material. In some embodiments, the silicon waveguide 125 may be pure silicon while in other embodiments the silicon waveguide 125 may be formed of a material that includes silicon.

The silicon waveguide 125 may be coupled with a component 130. In some embodiments, the component 130 may be directly coupled with the silicon waveguide 125 as shown, while in other embodiments the component 130 may be physically separate from, but still optically coupled with, the silicon waveguide 125 (e.g., through an intermediary coupling). The component 130 may be or include a laser, a modulator, a photodiode (PD), a receiver, or some other type of light source or component. It will be understood that although a single component 130 is depicted in FIG. 1, in other embodiments the transceiver 100 may include a plurality of components.

As may be seen, the SiN waveguide 105 may at least partially overlap the silicon waveguide 125 in the overlap region 135. As may be seen in FIG. 1, the silicon waveguide 125 may be tapered within the overlap region 135. In the specific embodiment of FIG. 1, the silicon waveguide 125 may be tapered downward (with respect to the orientation of the Figure) towards the BOX layer 120. This specific taper may be referred to as a "grayscale taper" and may be desirable because it may be easier to form from a manufacturing standpoint or provide lower loss. However, in other embodiments the silicon waveguide 125 may taper upwards (with respect to the orientation of the Figure) towards the SiN waveguide 105. As may be described in further detail with respect to FIG. 9, in some embodiments the SiN waveguide 105 may be directly physically coupled with the silicon waveguide 125 at the overlap region 135. In other words, the SiN waveguide 105 may follow the taper of the silicon waveguide 125.

It will be understood that this specific taper configuration is intended as one example of such a configuration, and in other embodiments the specific length of the taper, the direction of the taper, or the relative configuration of the silicon waveguide 125 and the SiN waveguide 105 may differ. For example, in some embodiments the silicon waveguide 125 may be at least partially above of the SiN waveguide 105 (with respect to the orientation of the Figure) rather than beneath the SiN waveguide 105. In some embodiments the taper within the overlap region 135 may not be linear, as shown, but rather may be curved, stepped, or have some other shape. Other variations may be present in other embodiments.

A variety of features of the transceiver 100 may further be noted from FIG. 2. For example, in some embodiments it may be desirable for the SiN waveguide 105 to also taper from the overlap region 135 to a portion of the SiN waveguide 105 that is optically coupled to the optical fiber 145. Specifically, as may be seen, the SiN waveguide 105 may have a width X1 at a portion of the SiN waveguide 105 that is near the overlap region 135, and a width X2 that is at a portion of the SiN waveguide 105 that is adjacent the optical fiber 145. In this embodiment, X2 may be less than X1. More generally, X1 may be between approximately 0.4 microns and approximately 13 microns. X2 may be between approximately 0.05 microns and approximately 0.15 microns. However, it will be recognized that in other embodiments the SiN waveguide 105 may not taper, may taper in a non-linear fashion, or may additionally or alternatively taper in a vertical direction (e.g., parallel to the axis indication by the z-heights Z1 and Z2) rather than the depicted lateral direction (e.g., parallel to the face of the dielectric layer 110 to which the SiN waveguide 105 is coupled). Other variations may be present in other embodiments.

In some embodiments, the SiN waveguide 105 may be tapered instead of, or in addition to, the Si waveguide 125. Such embodiments are not shown for the sake of lack of redundancy. Such a taper of the SiN waveguide 105 may be desirable in some embodiments because it may allow the flexibility of adding an even thicker dielectric layer 110, which may act as optical cladding. Additionally, tapering the SiN waveguide 105 may provide increased coupling efficiency due to mode size expansion.

Figure 3:
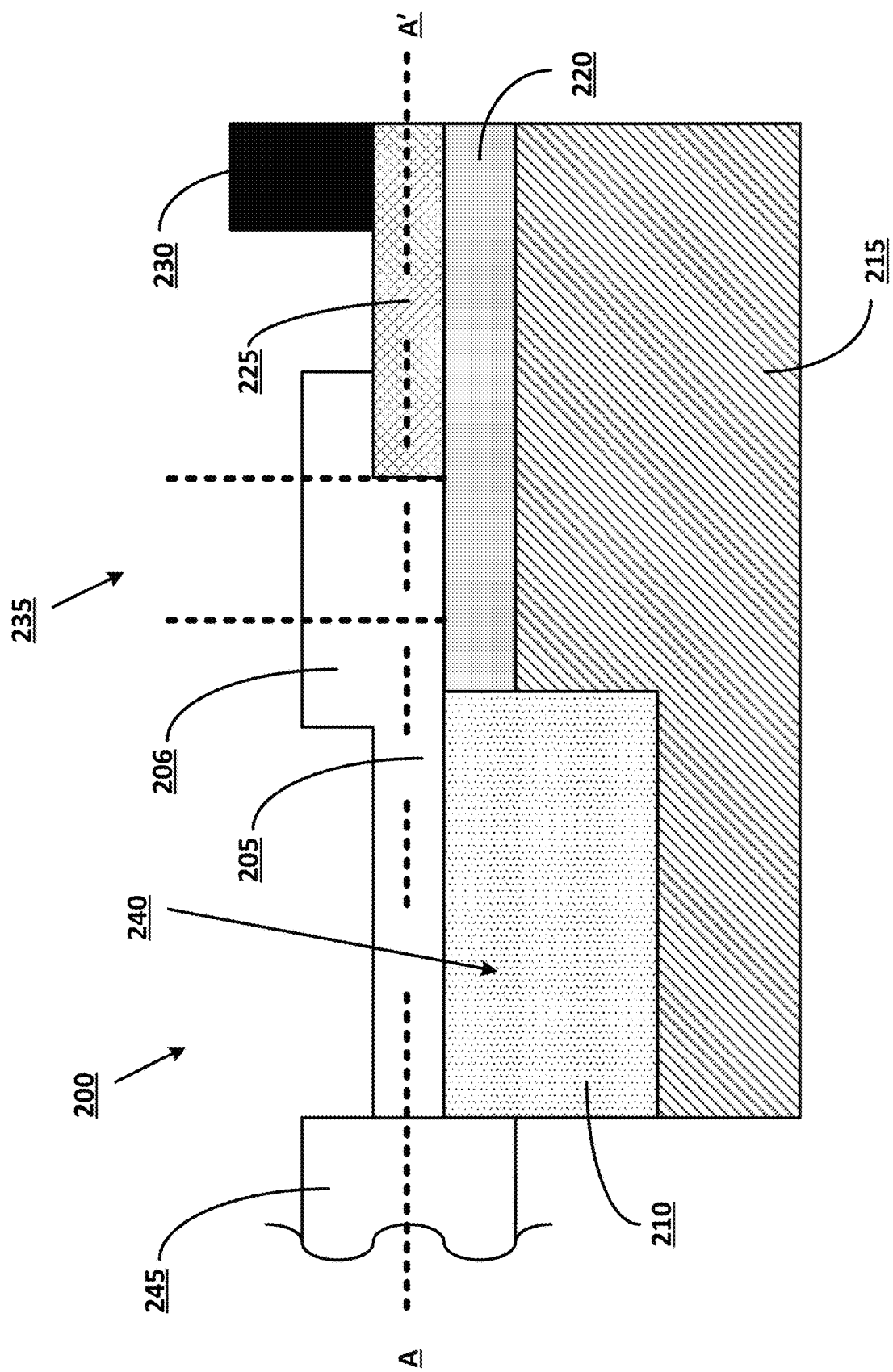
FIG. 3 depicts an alternative example side-view of a photonic transceiver, in accordance with various embodiments.
Figure 4:
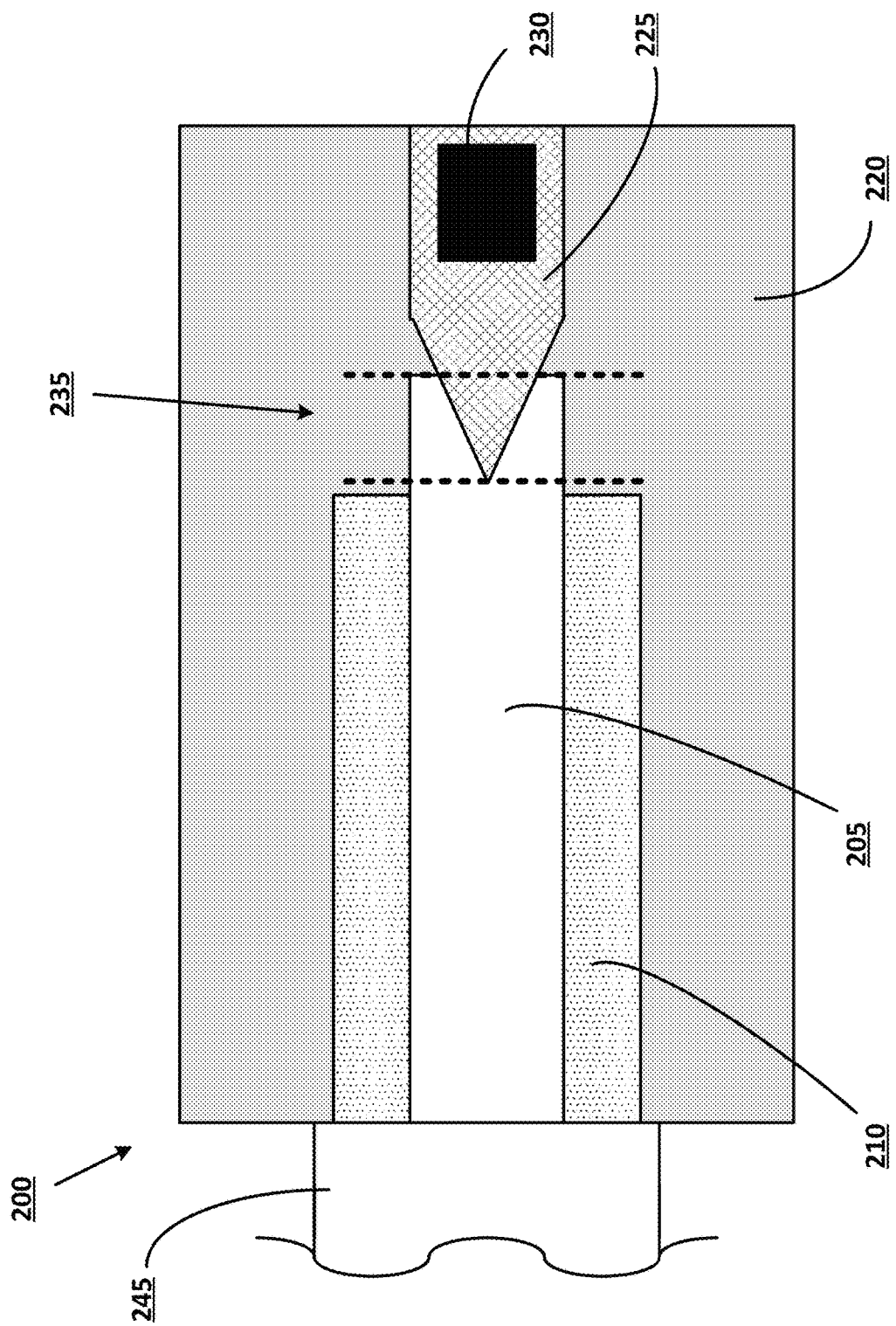
FIG. 4 depicts an example top-down view of the photonic transceiver of FIG. 3, in accordance with various embodiments.

FIGS. 3 and 4 depict an alternative transceiver 200 which may include one or more features that are similar to, and share one or more characteristics with, the transceiver 100. Specifically, FIG. 3 depicts an alternative example side-view of a photonic transceiver 200, in accordance with various embodiments. FIG. 4 depicts an example top-down view of the photonic transceiver 200 of FIG. 3, in accordance with various embodiments. Generally, FIG. 4 may be seen to be a view taken along line A-A' of FIG. 3.

The transceiver 200 may include a SiN waveguide 205, a dielectric layer 210, a substrate layer 215, a BOX layer 220, a silicon waveguide 225, a component 230, and an overlap region 235 which may be respectively similar to, and share one or more characteristics with, SiN waveguide 105, dielectric layer 110, substrate layer 115, BOX layer 120, silicon waveguide 125, component 130, and overlap region 135. The transceiver 200 may further be coupled with an optical fiber 245 which may be similar to, and share one or more characteristics with, optical fiber 145.

As may be seen in FIGS. 3 and 4, the transceiver 200 may have some variations from the transceiver 100 of FIGS. 1 and 2. Specifically, as may be seen the SiN waveguide 205 may be laterally adjacent to, rather than partially above or below, the silicon waveguide 225. However, in some embodiments the SiN waveguide 206 may include a portion 206 that is vertically positioned above the silicon waveguide 225 at least in the overlap region 235. This portion 206 may be desirable to compensate for specific optical modalities of a signal that is traveling between the silicon waveguide 225 and the SiN waveguide 205. However, it will be understood that in some embodiments the portion 206 may not be present if the optical modalities of the signal do not make it desirable.

As may be seen in FIG. 4, the silicon waveguide 225 may taper laterally (e.g., in a direction parallel to the face of the BOX layer 220 to which the silicon waveguide 225 is coupled) rather than vertically (e.g., as depicted in FIGS. 1 and 2). Additionally, as may be seen in FIG. 4, the SiN waveguide 205 may not taper along the length of the SiN waveguide 205 from the overlap region 235 to the optical fiber 245. In some embodiments, the taper of the SiN waveguide 205 may extend into or through the overlap region 235.

Similarly to transceiver 100, it will be understood that transceiver 200 is intended as an example of an embodiment of the present disclosure. The specific shape or length of the taper of the silicon waveguide 225 may be different in other embodiments, for example having a longer or shorter taper, being curved, stepped, etc. In some embodiments, the silicon waveguide of a transceiver may have both a vertical and a lateral taper (e.g., elements of the taper shown in both transceivers 100 and 200). Other embodiments may vary.

Figure 9:
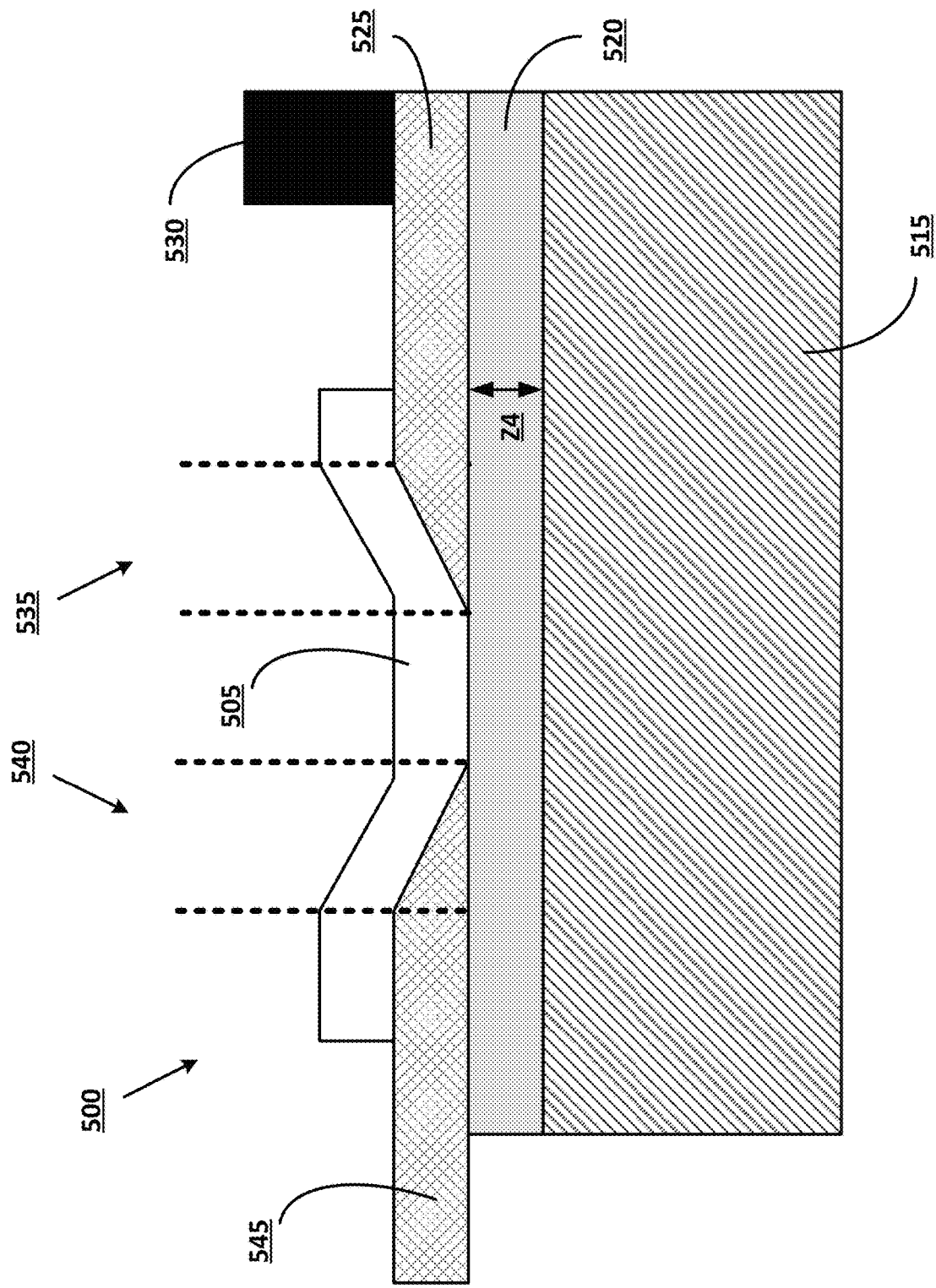
FIG. 9 depicts an alternative example side-view of a photonic transceiver, in accordance with various embodiments.

FIG. 9 depicts an alternative transceiver 500 which may include one or more features that are similar to, and share one or more characteristics with, the transceiver 100. Specifically, FIG. 9 depicts an alternative example side-view of a photonic transceiver 500, in accordance with various embodiments. The transceiver 500 may include a SiN waveguide 505, a substrate layer 515, a BOX layer 520, a silicon waveguide 525, a component 530, and an overlap region 535 which may be respectively similar to, and share one or more characteristics with, SiN waveguide 105, substrate layer 115, BOX layer 120, silicon waveguide 125, component 130, and overlap region 135.

The transceiver 500 may include a variety of differences from transceiver 100. For example, it may be noted that the substrate layer 515 may not include a dielectric layer such as dielectric layer 110 of FIGS. 1 and 2. The lack of the dielectric layer may be because the BOX layer 520 may have a sufficient thickness Z4 to prevent leakage of the optical signal from the SiN waveguide 505 into the silicon substrate 515. Specifically, the BOX layer 520 may have a thickness Z4 on the order of 2 microns or thicker.

Additionally, as may be seen in FIG. 9, the SiN waveguide 505 may be physically coupled with the silicon waveguide 525 in the overlap region 135. In other words, the SiN waveguide 505 may follow the taper of the silicon waveguide 525 throughout the overlap region 535. It will be understood that although the taper of the silicon waveguide 525 is depicted as being a vertical taper (in other words, going from thicker to thinner as the silicon waveguide 525 progresses from the right side of the Figure towards the left), in some embodiments the silicon waveguide 525 may additionally or alternatively include a lateral taper. In these embodiments, the SiN waveguide 505 may likewise follow the taper of the silicon waveguide 525 in one or more dimensions.

Finally, as previously noted, in some embodiments an optical fiber such as optical fiber 145 may not be present. Rather, an alternative optical element such as a silicon waveguide 545 may be present on the transceiver 500. In some embodiments (not shown for the sake of lack of clutter), the silicon waveguide 545 may itself be coupled with an optical fiber such as optical fiber 145, another component such as components 130/530, or some other element. In this embodiment, the SiN waveguide 505 may serve as an optical coupling between the silicon waveguide 525 and 545.

The silicon waveguide 545 may have a taper at an overlap region 540, which may be similar to the taper of the silicon waveguide 525. It will be noted that in some embodiments the SiN waveguide 545 may be optically or physically coupled with the silicon waveguide 545 in the overlap region 540, which may be similar to overlap region 535 as shown. In the depicted embodiment, the overlap region 540 may be generally identical to overlap region 535 in terms of scale, shape, etc. However, in other embodiments the silicon waveguide 545 may have a different type of taper than the taper of silicon waveguide 525. For example, silicon waveguide 545 may have a lateral taper, while silicon waveguide 525 has a vertical taper. In some embodiments, the SiN waveguide 505 may not follow the taper of one or both of the silicon waveguide 525/545.

As noted, embodiments herein may provide a number of advantages. For example, the presence of a SiN waveguide on a dielectric layer (e.g., SiN waveguide 105 or 205 on dielectric layers 110 or 210) may achieve low coupling loss, low polarization-dependent loss (PDL), and broad bandwidth. The coupler length may be shorter than in legacy transceivers, as the optical signal may expand through the dielectric layer or a cladding material that is deposited on top of the SiN waveguide (as depicted, e.g., in FIG. 6). Additionally, the overall wafer topography may be improved because thinner cladding layers may be available for use.

Generally, elements of various Figures herein, or various other embodiments, may be combined based on design considerations, material considerations, or other factors. For example, in some embodiments the embodiment of FIG. 9 wherein the SiN waveguide may follow the taper of the silicon waveguide may be present in embodiments such as those of FIGS. 1-4. In some embodiments, a dielectric layer such as dielectric layer 110 may be present in an embodiment such as that of FIG. 9. Other variations may likewise be present in other embodiments which may combine one or more elements of the various depicted embodiments.

Figure 5:
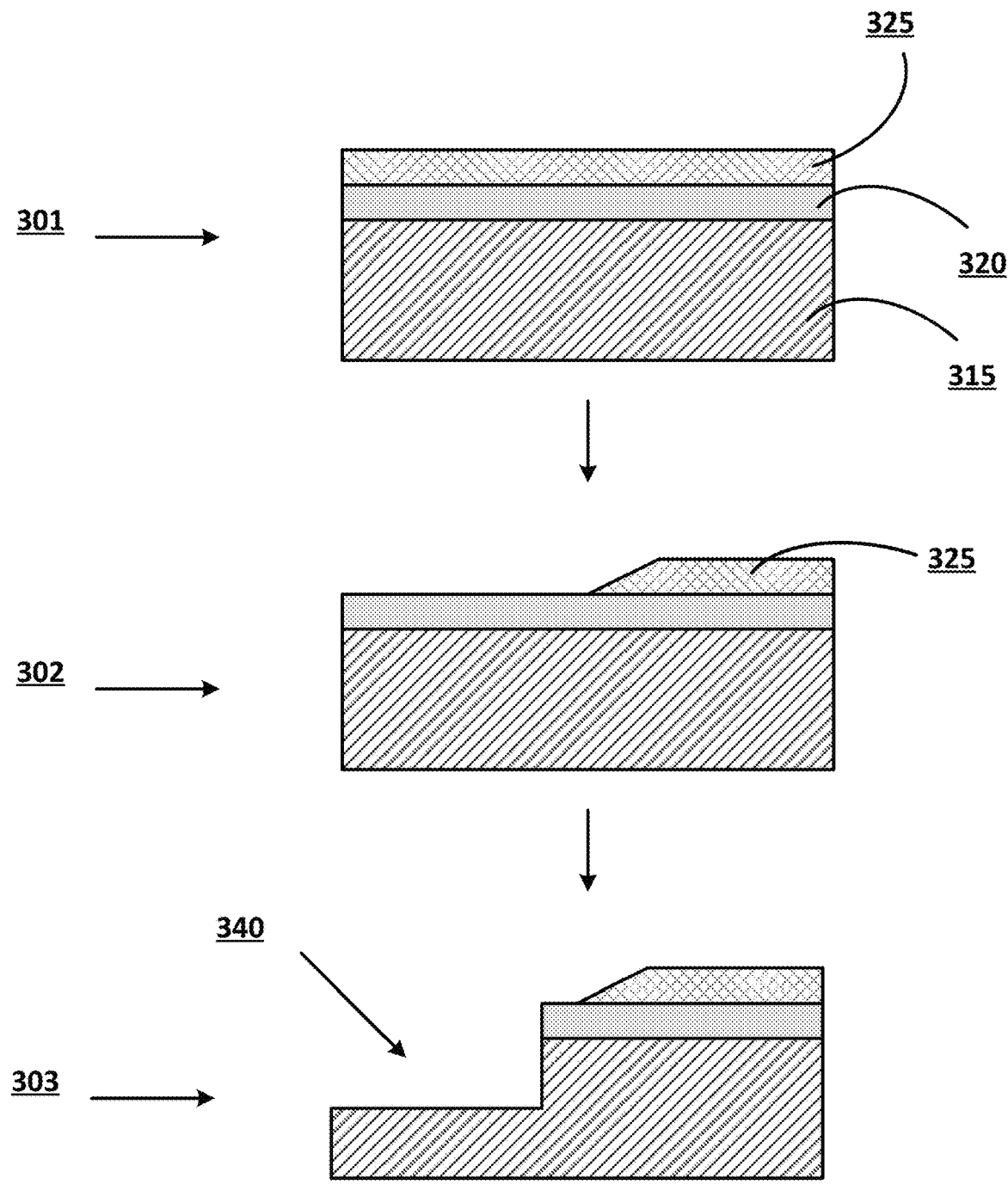
FIG. 5 depicts a simplified example process flow for the manufacture of a photonic transceiver, in accordance with various embodiments.
Figure 6:
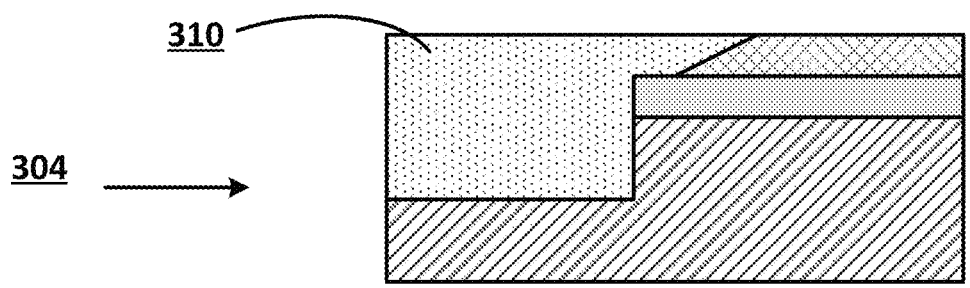
FIG. 6 further depicts the simplified example process flow of FIG. 5, in accordance with various embodiments.
Figure 6:
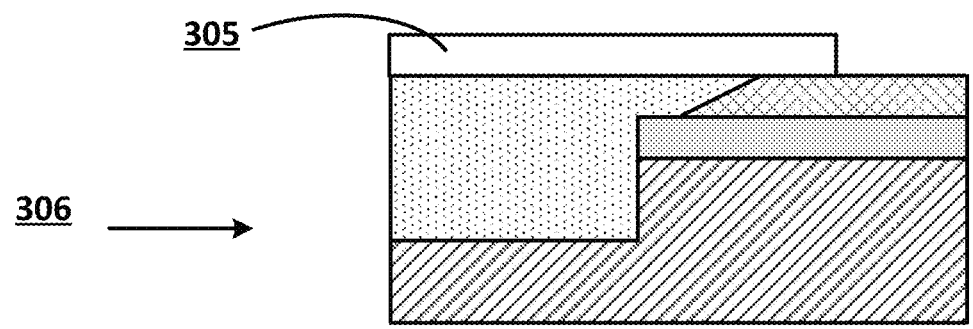
Figure 6:
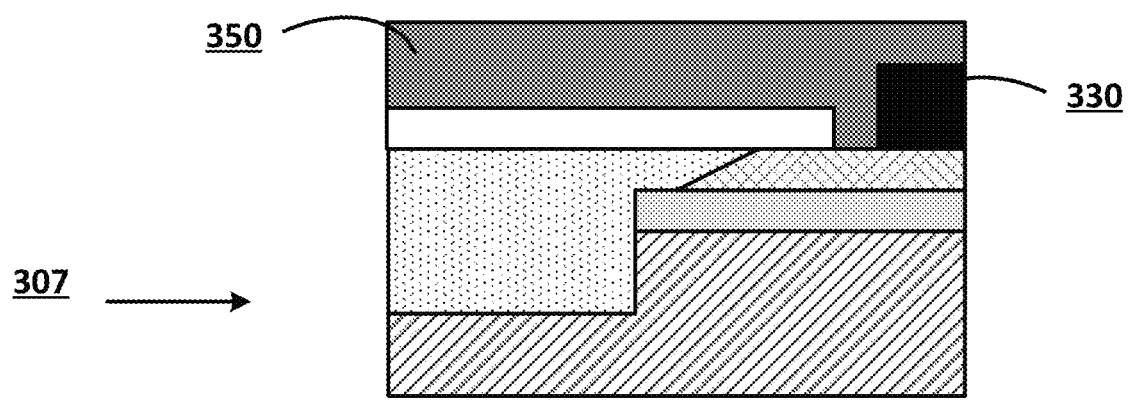

FIGS. 5 and 6 depict an example process flow by which a transceiver such as the transceiver 100 of FIGS. 1 and 2 may be formed. It will be understood that FIGS. 5 and 6 are intended as highly simplified embodiments of such a process flow, and real-world embodiments of the process flow may include more or fewer elements, or elements performed in a different order (e.g., concurrently with one another or in an opposite order) than depicted. It will be understood that although the process flow is generally depicted, and described, with respect to elements of the transceiver 100, in other embodiments the process flow may apply, in whole or in part, with or without modifications, to other embodiments such as the transceiver 200 or some other embodiment.

The process flow may start at 301 where a BOX layer 320 may be positioned on a substrate layer 315, and a silicon waveguide 325 may be positioned on the BOX layer 320. The substrate layer 315, BOX layer 320, and silicon waveguide 325 may be respectively similar to, and share one or more characteristics with, substrate layer 115, BOX layer 120, and silicon waveguide 125. The BOX layer 320 may be positioned on the substrate layer 315 through deposition, lamination, etc. Similarly, the silicon waveguide 325 may be positioned on the BOX layer 320 through deposition, lamination, etc. In some embodiments, positioning of the silicon waveguide 325 on the BOX layer 320 may include a photolithographic process, etching, etc.

The silicon waveguide 325 may then be tapered as shown at 302. As noted above, the tapering may be performed through optical etching, chemical etching, mechanical etching, drilling, etc. In some embodiments the silicon waveguide 325 may be pre-tapered prior to placement on the BOX layer 320.

A cavity 340 may then be formed in the substrate layer 315 and the BOX layer 320 as shown at 303. The cavity 340 may be similar to, and share one or more characteristics with, cavity 140 of FIG. 1. The cavity 340 may be formed through an etching process such as optical, chemical, or mechanical etching, drilling, or some other process. It will be understood that in other embodiment the cavity 340 may be preformed in the substrate layer 315 prior to the formation of the BOX layer 320 on the substrate layer 315. In other embodiments, the cavity 340 may be formed in the substrate layer 315 and the BOX layer 320 prior to the formation of the silicon waveguide 325 on the BOX layer 320.

At 304, a dielectric layer 310 may be formed within the cavity 340 and, optionally, on at least part of the BOX layer 320 or the silicon waveguide 325 as depicted at 304. The dielectric layer 310 may be similar to, and share one or more characteristics with, dielectric layer 110. The dielectric layer 310 may be formed through a technique such as deposition, lamination, etc.

The dielectric layer 310 may be polished (e.g., via mechanical or chemical means), and then a SiN waveguide 305 may be positioned on the dielectric layer 310 at 306. As noted, the SiN waveguide 305 may be positioned on the dielectric layer 310 through a technique such as LPCVD or some other technique. Positioning of the SiN waveguide 305 may further include patterning, etching, or otherwise processing the SiN waveguide 305. Such patterning may be desirable if the LPCVD technique deposits SiN across the entirety of the face of the dielectric layer 310, if a taper of the SiN waveguide is desired (as depicted in FIG. 2), or for some other purpose.

As shown at 307, the technique may include further processing to form a transceiver similar to transceivers 100 or 200. For example, a component 330 may be coupled with the silicon waveguide 325. The component 330 may be similar to, and share one or more characteristics with, component 130. In some embodiments, a cladding material 350 may also be deposited on the transceiver over the SiN waveguide 305, the silicon waveguide 325, the component 330, etc. The cladding material 350 may be, for example, an oxide-based dielectric material such as $SiO_2$, while in other embodiments the cladding material 350 may be some other material. It is noted that the cladding material 350 is not depicted in FIGS. 1-4 and 9 for the sake of clarity and easy of enumeration of the Figures, but may be present in real-world embodiments.

Figure 7:
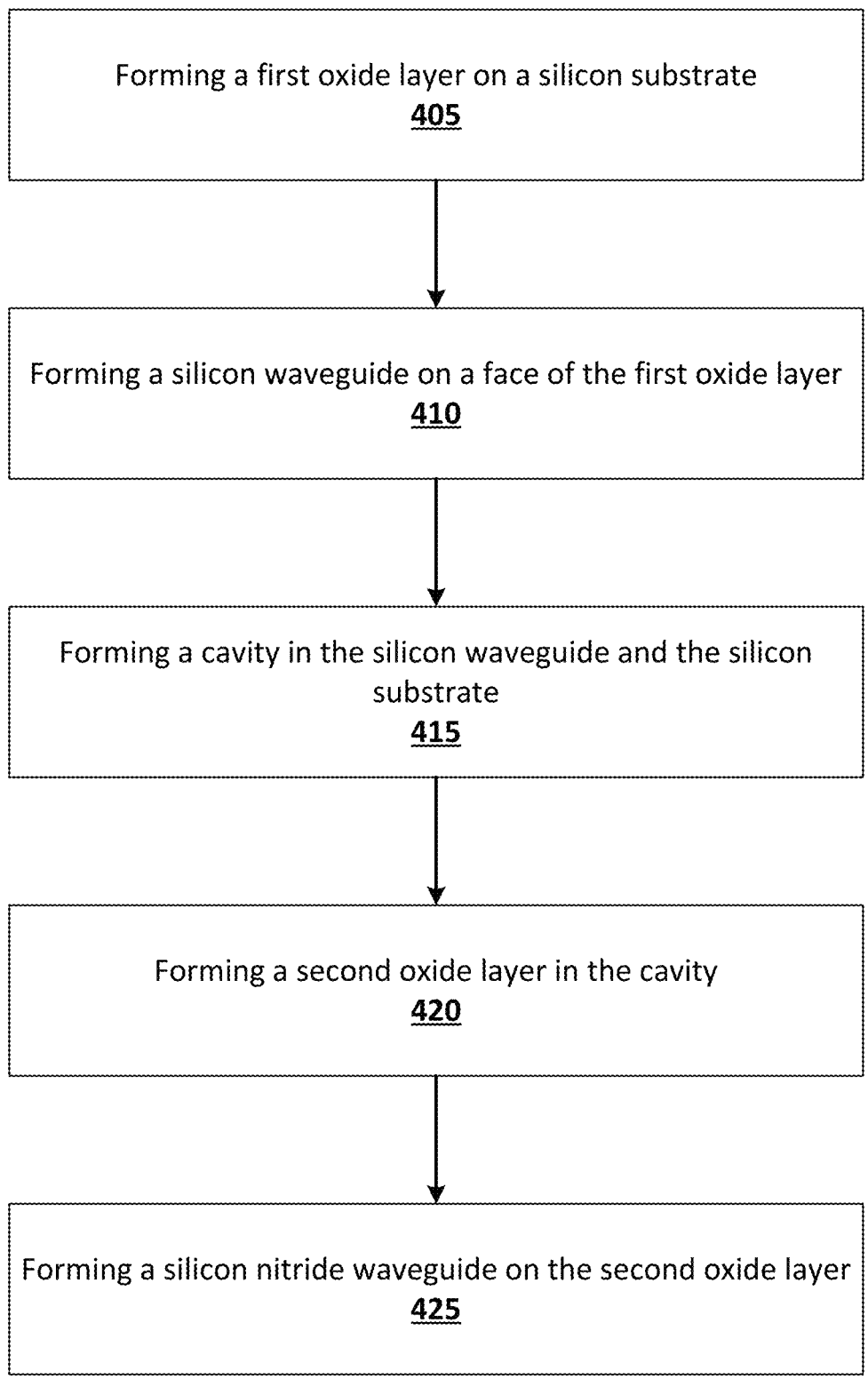
FIG. 7 depicts an example technique by which a photonic transceiver may be manufactured, in accordance with various embodiments.

FIG. 7 depicts an example flowchart related to a technique of manufacture of a transceiver such as the transceivers depicted herein. Similarly to the graphical depiction of FIGS. 5 and 6, it will be understood that FIG. 7 is intended as a highly simplified example of such a process flow, and real-world embodiments of the process flow may include more or fewer elements, or elements performed in a different order (e.g., concurrently with one another or in an opposite order) than depicted. It will be understood that although the process flow is generally depicted, and described, with respect to elements of the transceiver 100, in other embodiments the process flow may apply, in whole or in part, with or without modifications, to other embodiments such as the transceiver 200 or some other embodiment.

The process may include forming, at 405, a first oxide layer on a silicon substrate. The first oxide layer may be similar to, for example BOX layer 120, and the silicon substrate may be similar to, for example, substrate layer 115. As noted, formation of the oxide layer may be performed through deposition, lamination, or some other technique.

The process may further include forming, at 410, a silicon waveguide on a face of the first oxide layer. The silicon waveguide may be similar to, for example, silicon waveguide 125. As noted, formation of the silicon waveguide may include deposition, lamination, etc. which may be followed by etching, patterning, etc. for the purpose of shaping or tapering the silicon waveguide.

The process may further include forming, at 415, a cavity in the silicon waveguide and the silicon substrate. The cavity may be similar to, for example, cavity 140. Formation of the cavity may be performed through chemical etching, optical etching (e.g., a photolithographic process), mechanical etching or drilling, etc.

The process may further include forming, at 420, a second oxide layer in the cavity. The second oxide layer may be similar to, for example, the dielectric layer 110. As noted, formation of the second oxide layer may include deposition, lamination, etc. Subsequent to, or during, formation of the second oxide layer, the second oxide layer may be patterned or polished as noted above.

The process may further include forming, at 425, a SiN waveguide on the second oxide layer. The SiN waveguide may be similar to, for example, SiN waveguide 105. Formation of the SiN waveguide 105 may be performed through LPCVD or some other technique.

Figure 8:
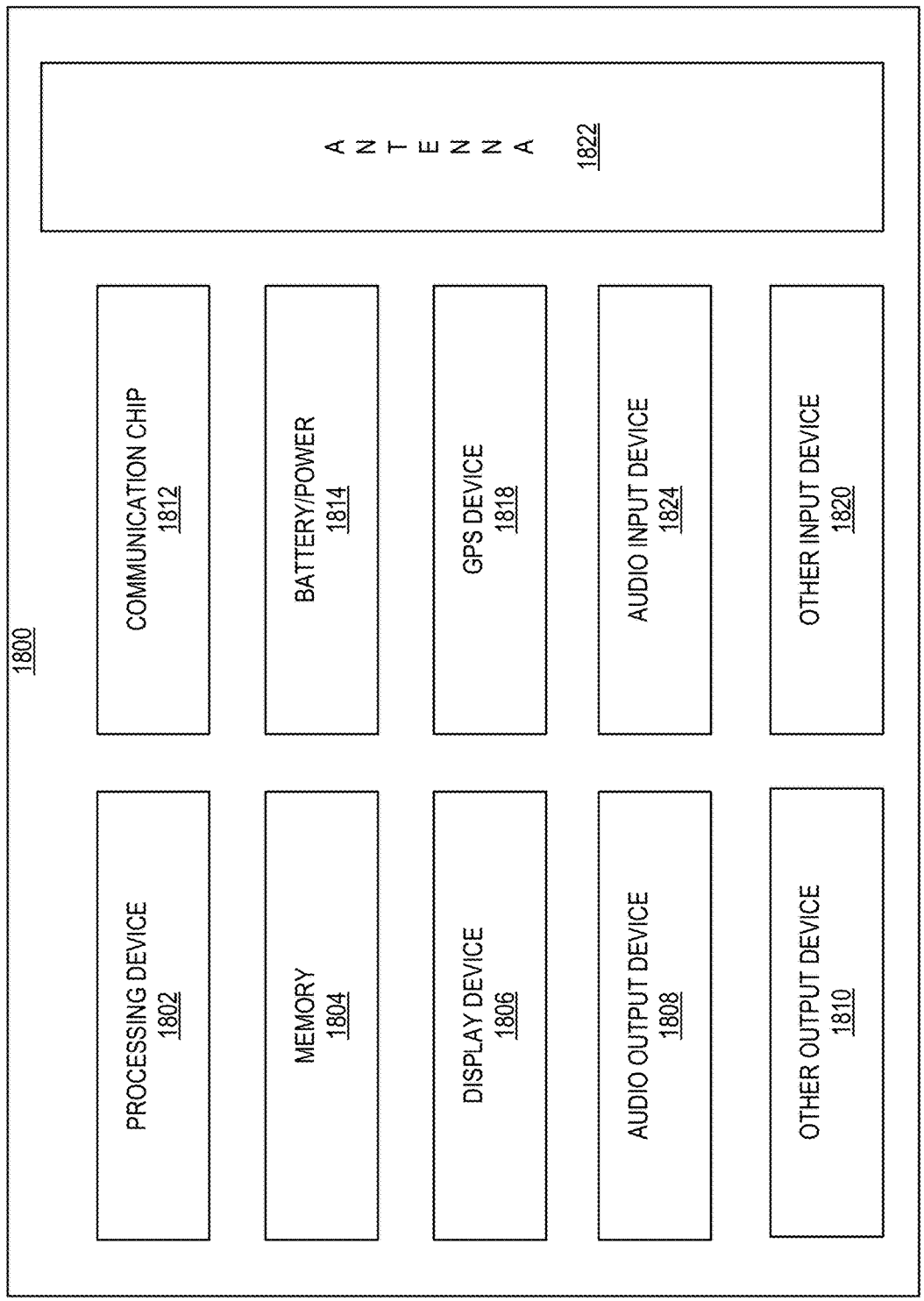
FIG. 8 is a block diagram of an example electrical device that may include a photonic transceiver, in accordance with various embodiments.

FIG. 8 is a block diagram of an example electrical device 1800 that may include one or more optical transceivers, in accordance with any of the embodiments disclosed herein. A number of components are illustrated in FIG. 8 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 8, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

EXAMPLES OF VARIOUS EMBODIMENTS

Example 1 includes a wavelength-division multiplexing (WDM) transceiver comprising: a silicon substrate with a first z-height as measured in a z-direction at a first portion of the silicon substrate and a second z-height as measured in the z-direction at a second portion of the silicon substrate that is different than the first portion; a first oxide layer coupled with the first portion of the silicon substrate; a second oxide layer coupled with the second portion of the silicon substrate; a silicon waveguide layer coupled with the first oxide layer; and a silicon nitride waveguide layer coupled with the second oxide layer, and wherein the silicon nitride waveguide layer is further coupled with a portion of the silicon waveguide layer.

Example 2 includes the WDM transceiver of example 1, further comprising a photodetector, a modulator, or a laser coupled with the silicon waveguide layer.

Example 3 includes the WDM transceiver of example 1, wherein the silicon nitride waveguide layer is adjacent to the silicon waveguide layer in the z-direction.

Example 4 includes the WDM transceiver of example 1, wherein the silicon nitride waveguide layer is adjacent to the silicon waveguide layer in a direction that is perpendicular to the z-direction.

Example 5 includes the WDM transceiver of any of examples 1-4, wherein the second oxide layer is further coupled with the first oxide layer.

Example 6 includes the WDM transceiver of any of examples 1-4, wherein the z-height of the second portion is less than the z-height of the first portion.

Example 7 includes the WDM transceiver of any of examples 1-4, wherein the portion of the silicon waveguide layer is tapered in a direction that is perpendicular to the z-direction.

Example 8 includes the WDM transceiver of any of examples 1-4, wherein the portion of the silicon waveguide layer is tapered in the z-direction.

Example 9 includes an optical device comprising: a first oxide layer with a thickness that is at least 2 micrometers as measured in a z-direction; a silicon waveguide coupled with the first oxide layer, wherein the silicon waveguide includes a tapered portion; and a silicon nitride waveguide adjacent to the tapered portion of the silicon waveguide; wherein the silicon nitride waveguide overlaps the silicon waveguide at the tapered portion of the silicon waveguide and the silicon nitride waveguide is optically coupled with the silicon waveguide.

Example 10 includes the optical device of example 9, wherein the silicon nitride waveguide is physically coupled with the tapered portion of the silicon waveguide.

Example 11 includes the optical device of example 9, wherein the silicon nitride waveguide overlaps the silicon waveguide in the z-direction.

Example 12 includes the optical device of example 9, wherein the silicon nitride waveguide overlaps the silicon waveguide in a lateral direction that is perpendicular to the z-direction.

Example 13 includes the optical device of any of examples 9-12, further comprising a second oxide layer with a second thickness that is different than the first thickness, wherein the second oxide layer is adjacent to the first oxide layer and the silicon nitride waveguide is coupled with the second oxide layer.

Example 14 includes the optical device of example 13, further comprising a silicon layer coupled with the first and second oxide layers such that the first oxide layer is between the silicon waveguide and the silicon layer, and the second oxide layer is between the silicon nitride waveguide and the silicon layer.

Example 15 includes the optical device of example 13, further comprising a third oxide layer coupled with the silicon waveguide and the silicon nitride waveguide such that the silicon waveguide is between the first oxide layer and the third oxide layer, and the silicon nitride waveguide is between the second oxide layer and the third oxide layer.

Example 16 includes a method of forming an optical coupling for use in a wavelength-division multiplexed (WDM) transceiver, the method comprising: forming a first oxide layer on a silicon substrate; forming a silicon waveguide on a face of the first oxide layer; forming a cavity in the silicon waveguide and the silicon substrate; forming a second oxide layer in the cavity; and forming a silicon nitride waveguide on the second oxide layer, wherein the silicon nitride waveguide overlaps a portion of the silicon waveguide.

Example 17 includes the method of example 16, wherein forming the silicon waveguide includes tapering the portion of the silicon waveguide in a direction that is perpendicular to the face of the first oxide layer.

Example 18 includes the method of example 16, wherein forming the silicon waveguide includes tapering the portion of the silicon waveguide in a direction that is parallel to the face of the first oxide layer.

Example 19 includes the method of any of examples 16-18, wherein the silicon nitride waveguide is adjacent to the portion of the silicon waveguide in a direction parallel to the face of the first oxide layer.

Example 20 includes the method of any of examples 16-18, wherein the portion of the silicon waveguide is between the silicon nitride waveguide and the first oxide layer.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A wavelength-division multiplexing (WDM) transceiver, comprising:
a substrate with a first z-height measured in a z-direction at a first portion of the substrate and a second z-height measured in the z-direction at a second portion of the substrate that is different than the first portion;
a first insulator layer over the first portion of the substrate;
a second insulator layer over the second portion of the substrate;
a first waveguide over the first insulator layer, the first waveguide having a first thickness measured in the z-direction at a first portion of the first waveguide and a second thickness measured in the z-direction at a second portion of the first waveguide, wherein the second thickness is greater than the first thickness; and a second waveguide over the second insulator layer, wherein the second waveguide is coupled with a portion of the first waveguide, wherein the first waveguide includes silicon, and the second waveguide includes silicon and nitrogen.

2. The WDM transceiver of claim 1, further comprising a photodetector, a modulator, or a laser coupled with the first waveguide.

3. The WDM transceiver of claim 1, wherein the second waveguide is adjacent to the first waveguide in the z-direction.

4. The WDM transceiver of claim 1, wherein the second waveguide is adjacent to the first waveguide in a direction that is perpendicular to the z-direction.

5. The WDM transceiver of claim 1, wherein the second insulator layer is coupled with the first insulator layer.

6. The WDM transceiver of claim 1, wherein the second z-height is smaller than the first z-height.

7. The WDM transceiver of claim 1, wherein the portion of the first waveguide is tapered in a direction that is perpendicular to the z-direction.

8. The WDM transceiver of claim 1, wherein:
the second waveguide has a first end and a second end,
the second end of the second waveguide is closer to the first waveguide than the first end of the second waveguide, and
the first portion of the second waveguide is closer to the first end of the second waveguide than the second portion of the first waveguide.

9. The WDM transceiver of claim 8, wherein:
a portion of the second waveguide overlaps with a portion of the first waveguide, and
in the z-direction, the portion of the second waveguide that overlaps with the portion of the first waveguide is conformal to the portion of the first waveguide.

10. The WDM transceiver of claim 1, wherein:
the second waveguide has a first end and a second end,
the second end of the second waveguide is closer to the first waveguide than the first end of the second waveguide, and
the second portion of the first waveguide is closer to the first end of the second waveguide than the first portion of the first waveguide.

11. The WDM transceiver of claim 1, wherein:
the second waveguide has a first end and a second end,
the second end of the second waveguide is closer to the first waveguide than the first end of the second waveguide,
the second waveguide has a first portion and a second portion,
the first portion of the second waveguide is closer to the first end of the second waveguide than the second portion of the second waveguide,
the second portion of the second waveguide overlaps, in the z-direction, with a portion of the first waveguide,
the first portion of the second waveguide tapers in a direction perpendicular to the z-direction, and
the second portion of the second waveguide does not taper in the direction perpendicular to the z-direction.

12. A method of forming a wavelength-division multiplexed (WDM) transceiver, the method comprising:
providing a substrate with a first z-height measured in a z-direction at a first portion of the substrate and a second z-height measured in the z-direction at a second portion of the substrate that is different than the first portion;
providing a first insulator layer over the first portion of the substrate;
providing a second insulator layer over the second portion of the substrate;
providing a first waveguide over the first insulator layer, the first waveguide having a first thickness measured in the z-direction at a first portion of the first waveguide and a second thickness measured in the z-direction at a second portion of the first waveguide, wherein the second thickness is greater than the first thickness; and
providing a second waveguide over the second insulator layer, wherein the second waveguide is coupled with a portion of the first waveguide, wherein the first waveguide includes silicon, and the second waveguide includes silicon and nitrogen.

13. The method of claim 12, wherein providing the first waveguide includes tapering a portion of the first waveguide in the z-direction.

14. The method of claim 12, wherein providing the first waveguide includes tapering a portion of the first waveguide in a direction perpendicular to the z-direction.

15. The method of claim 12, wherein the second waveguide is adjacent to a portion of the first waveguide in a direction parallel to a face of the first insulator layer.

16. The method of claim 12, wherein a portion of the first waveguide is between the second waveguide and the first insulator layer.

17. A wavelength-division multiplexing (WDM) transceiver, comprising:
a substrate with a first z-height measured in a z-direction at a first portion of the substrate and a second z-height measured in the z-direction at a second portion of the substrate that is different than the first portion;
a first insulator layer over the first portion of the substrate;
a second insulator layer over the second portion of the substrate;
a first waveguide over the first insulator layer, wherein a portion of the first waveguide tapers in a direction perpendicular to the z-direction; and
a second waveguide over the second insulator layer, wherein the second waveguide is coupled with a portion of the first waveguide, the first waveguide includes silicon, the second waveguide includes silicon and nitrogen, and the second waveguide does not taper in the direction perpendicular to the z-direction.

18. The WDM transceiver of claim 17, wherein:
the second waveguide has a first end and a second end,
the second end of the second waveguide is closer to the first waveguide than the first end of the second waveguide,
the first waveguide has a first portion and a second portion,
the first portion of the first waveguide is closer to the first end of the second waveguide than the second portion of the first waveguide,
a portion of the second waveguide overlaps, in the z-direction, with the first portion of the first waveguide, and
the first portion of the first waveguide includes the portion of the first waveguide that tapers in the direction perpendicular to the z-direction.

19. The WDM transceiver of claim 18, wherein the second portion of the first waveguide does not taper in the direction perpendicular to the z-direction.

20. The WDM transceiver of claim 19, wherein the second waveguide does not overlap with the second portion of the first waveguide.

\* \* \* \* \*